US012786333B2

(12) United States Patent
Hayashi et al.

(10) Patent No.: US 12,786,333 B2
(45) Date of Patent: Nov. 3, 2026

(54) RECORDING APPARATUS AND MEDIUM SUPPORTING DEVICE

(71) Applicant: SEIKO EPSON CORPORATION, Tokyo (JP)

(72) Inventors: Seiya Hayashi, Matsumoto (JP); Tsuneyuki Sasaki, Matsumoto (JP); Junya Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 18/477,275

(22) Filed: Sep. 28, 2023

(65) Prior Publication Data

US 2024/0114100 A1 Apr. 4, 2024

(30) Foreign Application Priority Data

Sep. 29, 2022 (JP) ................................ 2022-156889

(51) Int. Cl.

*G06F 15/00* (2006.01)
*H04N 1/00* (2006.01)
*H04N 1/028* (2006.01)

(52) U.S. Cl.

CPC ..... *H04N 1/00997* (2013.01); *H04N 1/00045* (2013.01); *H04N 1/00267* (2013.01); *H04N 1/0061* (2013.01); *H04N 1/0282* (2013.01)

(58) Field of Classification Search

None

See application file for complete search history.

(56) References Cited

U.S. PATENT DOCUMENTS

2014/0209654 A1 7/2014 Ishizuka
2016/0283831 A1* 9/2016 Anzai ...................... B41J 13/26

FOREIGN PATENT DOCUMENTS

JP 2014-159152 A 9/2014
JP 2020131486 8/2020

* cited by examiner

*Primary Examiner* — Mark R Milia

(74) *Attorney, Agent, or Firm* — WORKMAN NYDEGGER

(57) ABSTRACT

A recording apparatus includes a support unit including a support surface configured to support a medium, a recording unit configured to perform recording on the medium supported by the support unit, and a projection unit configured to project an image onto the support surface. The projection unit includes an irradiation unit configured to irradiate the support surface with light, and a light blocking portion configured to block a part of the light emitted from the irradiation unit. The light blocking portion includes at least one light blocking region configured to block the part of the light emitted from the irradiation unit. The projection unit is configured to project a reference position image indicating a reference position of the medium supported by the support surface onto the support surface by blocking the part of the light emitted by the irradiation unit with the at least one light blocking region.

9 Claims, 7 Drawing Sheets

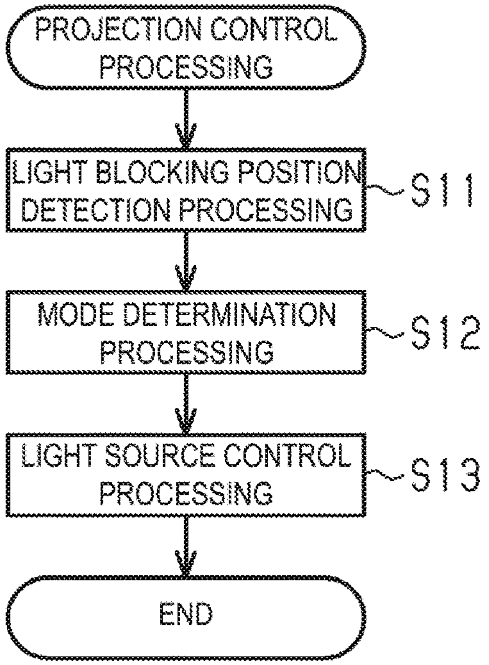

FIG. 9

| MODE | IRRADIATION CONTROL CONTENT (x,y) | | | |
|---|---|---|---|---|
| | 1,1 to 1,5<br>5,1 to 5,5 | 2,1 to 2,5<br>4,1 to 4,5 | 3,1/3,3/3,5 | 3,2/3,4 |
| FULL ILLUMINATION | TURN-ON AT LOW INTENSITY | TURN-ON AT LOW INTENSITY | TURN-ON AT LOW INTENSITY | TURN-ON AT LOW INTENSITY |
| FIRST NARROW WIDTH | TURN-OFF | TURN-ON AT MIDDLE INTENSITY | TURN-ON AT LOW INTENSITY | TURN-OFF |
| SECOND NARROW WIDTH | TURN-OFF | TURN-ON AT HIGH INTENSITY | TURN-ON AT LOW INTENSITY | TURN-OFF |
| FIRST WIDE WIDTH | TURN-ON AT MIDDLE INTENSITY | TURN-OFF | TURN-ON AT LOW INTENSITY | TURN-OFF |
| SECOND WIDE WIDTH | TURN-ON AT HIGH INTENSITY | TURN-OFF | TURN-ON AT LOW INTENSITY | TURN-OFF |

FIG. 10

RECORDING APPARATUS AND MEDIUM SUPPORTING DEVICE

The present application is based on and claims priority from JP Application Serial Number 2022-156889, filed Sep. 29, 2022, the disclosure of which is hereby incorporated by reference herein in its entirety.

BACKGROUND

1. Technical Field

The present disclosure relates to a recording apparatus and a medium supporting device.

2. Related Art

JP-A-2014-159152 discloses a recording apparatus including a transport belt including a support surface that transports a medium in a state in which the medium is supported thereon, and a recording unit that performs recording on the medium supported by the support surface. In such a recording apparatus, a reference position serving as a reference when the medium is placed is recorded on the support surface by the recording unit, or is attached in advance by a method other than recording by the recording unit.

However, in such a recording apparatus, when the reference position is recorded on the support surface by a storage unit, for example, there is a concern that a consumption amount of liquid for recording or the like may increase. In addition, when the reference position is attached to the support surface by a method other than the recording by the recording unit, there is a concern that visibility may be reduced due to deterioration over time. Therefore, it is desired to improve convenience of a user by providing the reference position on the support surface in a suitable manner.

SUMMARY

A recording apparatus that solves the above problems includes a support unit including a support surface configured to support a medium, a recording unit configured to perform recording on the medium supported by the support unit, and a projection unit configured to project an image onto the support surface, wherein the projection unit includes an irradiation unit configured to irradiate the support surface with light, and a light blocking portion configured to block a part of the light emitted from the irradiation unit, the light blocking portion includes at least one light blocking region configured to block the part of the light emitted from the irradiation unit, and the projection unit is configured to project a reference position image onto the support surface by blocking the part of the light emitted by the irradiation unit with the at least one light blocking region, the reference position image indicating a reference position of the medium supported by the support surface.

A medium supporting device that solves the above problems includes a support unit including a support surface configured to support a medium being a recording target, and a projection unit configured to project an image onto the support surface, wherein the projection unit includes an irradiation unit configured to irradiate the support surface with light, and a light blocking portion configured to block a part of the light emitted from the irradiation unit, the light blocking portion includes at least one light blocking region configured to block the part of the light emitted from the irradiation unit, and the projection unit is configured to project a reference position image onto the support surface by blocking the part of the light emitted by the irradiation unit with the at least one light blocking region, the reference position image indicating a reference position of the medium supported by the support surface.

BRIEF DESCRIPTION OF THE DRAWINGS

FIG. 9 is a flowchart illustrating projection control processing.

FIG. 10 is a schematic diagram illustrating irradiation control information.

DESCRIPTION OF EMBODIMENTS

First Embodiment

One embodiment of a recording apparatus will be described below. In the following description, a direction intersecting (for example, orthogonal to) a vertical direction Z is referred to as a width direction X, and a direction intersecting the vertical direction Z and the width direction X is referred to as a forward-rearward direction Y. One side in the width direction X is defined as a first width direction X1, and the other side in the width direction X is defined as a second width direction X2. One side in the forward-rearward direction Y is referred to as a front side Y1, and the other side in the forward-rearward direction Y is referred to as a rear side Y2. An upper side in the vertical direction Z is referred to as an upper side Z1, and a lower side in the vertical direction Z is referred to as a lower side Z2. The width direction X corresponds to a width direction of a medium, and the forward-rearward direction Y corresponds to a transport direction of the medium.

Recording Apparatus 10

Figure 1:
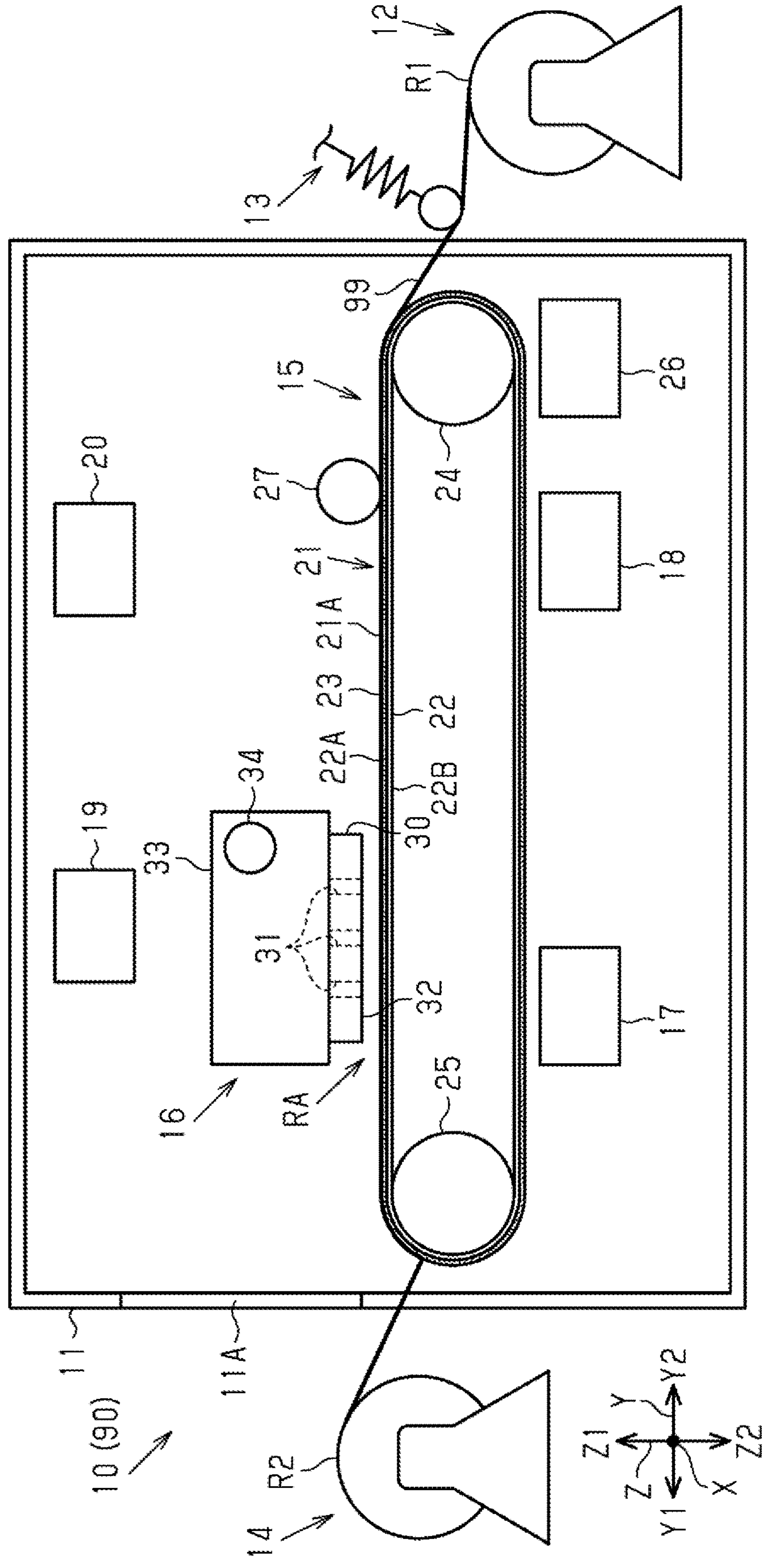
FIG. 1 is a side view schematically illustrating an embodiment of a recording apparatus.

As illustrated in FIG. 1, a recording apparatus 10 is configured to perform recording on a medium 99. The recording apparatus 10 may be configured to record an image on the medium 99 by discharging liquid onto the medium 99. In particular, the recording apparatus 10 may be an ink jet printer.

The recording apparatus 10 may include a housing 11, a medium holding unit 12, a tension adjustment unit 13, a medium collection unit 14, and a transport unit 15. The recording apparatus 10 includes a recording unit 16. The recording apparatus 10 may include a cleaning unit 17 and a drying unit 18. The recording apparatus 10 includes a projection unit 19. The recording apparatus 10 may include a control unit 20.

The recording apparatus 10 may include a medium supporting device 90. The medium supporting device 90 is configured to support at least the medium 99 that is a recording target. The medium supporting device 90 includes at least a transport unit 15 and a projection unit 19. The medium supporting device 90 may include a housing 11 and a control unit 20. The medium supporting device 90 may not include the recording unit 16.

The housing 11 is configured to accommodate at least the recording unit 16 and the projection unit 19. The housing 11 may be configured to accommodate the transport unit 15 and the control unit 20. In particular, the housing 11 may be configured to accommodate a part or the whole of a transport belt 21 which will be described below. The housing 11 does not accommodate the medium holding unit 12, the tension adjustment unit 13, and the medium collection unit 14, but may accommodate them.

The housing 11 includes a light transmitting portion 11A. The light transmitting portion 11A has a light transmitting property. The light transmitting portion 11A is configured so that the inside of the housing 11 can be visually recognized from the outside of the housing 11. In particular, the light transmitting portion 11A is configured so that a support surface 21A of the transport belt 21 described below can be visually recognized from the outside of the housing 11. The housing 11 may include an opening and closing cover (not illustrated). The opening and closing cover is opened when the medium 99 is installed. The opening and closing cover is closed when recording is performed on the medium 99. The housing 11 may include an opening (not illustrated) for transporting the medium 99.

The medium holding unit 12 is configured to rotatably hold a first roll body R1. The first roll body R1 is the medium 99 before recording that has been wound. The medium 99 may be elongated. The medium holding unit 12 is configured to hold the medium 99 before recording to be supplied to the recording unit 16.

The tension adjustment unit 13 is located between the medium holding unit 12 and the recording unit 16. The tension adjustment unit 13 is configured to adjust tension of the medium 99 to be constant between the medium holding unit 12 and the recording unit 16.

The medium collection unit 14 is configured to hold a second roll body R2. The second roll body R2 is the medium 99 after recording that has been wound. The medium collection unit 14 is configured to hold the medium 99 after recording to be supplied from the recording unit 16. The medium collection unit 14 winds up the medium 99 from the recording unit 16. That is, the medium collection unit 14 is configured to collect the medium 99 on which recording is performed by the recording unit 16. The medium collection unit 14 is configured to collect the medium 99 by rotating the second roll body R2.

The transport unit 15 is capable of transporting the medium 99 to the front side Y1, but may also be capable of transporting the medium 99 to the rear side Y2. The transport unit 15 can transport the medium 99, which is long in the forward-rearward direction Y, to the front side Y1. In particular, the transport unit 15 is configured to transport the medium 99 and to support the medium 99 being transported. The medium 99 may be a single sheet of paper. In addition, the medium 99 may be long in the width direction X.

The transport unit 15 may include a transport belt 21. The transport belt 21 is configured to transport the medium 99 while supporting the medium 99. The transport belt 21 is provided in an endless shape. The transport belt 21 includes a support surface 21A. The support surface 21A is a surface that is an outer peripheral surface of the transport belt 21. The support surface 21A is capable of supporting the medium 99 that is a recording target. Thus, the transport belt 21 supports the medium 99 to be transported. The transport belt 21 functions as an example of a support unit including the support surface 21A. The support unit includes the transport belt 21.

The transport belt 21 includes a base 22 and an adhesive layer 23. The base 22 is provided in an endless shape. The base 22 includes a first surface 22A and a second surface 22B. The first surface 22A is a surface serving as an outer peripheral surface of the base 22. The first surface 22A is a surface facing the recording unit 16. The second surface 22B is a surface serving as an inner peripheral surface of the base 22. The second surface 22B is a surface opposite to the first surface 22A.

The adhesive layer 23 is provided on the first surface 22A. The adhesive layer 23 has adhesiveness. The adhesive layer 23 is formed by applying an adhesive on the first surface 22A. The adhesive may be, for example, a thermoplastic resin. The adhesive layer 23 is formed over the entire perimeter of the first surface 22A. The adhesive layer 23 is a layer for attaching the medium 99. Therefore, the transport belt 21 transports the medium 99 attached to the adhesive layer 23.

The transport belt 21 is wound around a first roller 24 and a second roller 25 which will be described below. Therefore, the second surface 22B of the base 22 comes into contact with the first roller 24 and the second roller 25.

The transport unit 15 may include the first roller 24, the second roller 25, and a roller driving unit 26. The first roller 24 is configured to be rotatable. The first roller 24 may be coupled to the roller driving unit 26. The second roller 25 is configured to be rotatable. The second roller 25 is driven by rotation of the transport belt 21. That is, the second roller 25 is driven by rotation of the first roller 24.

The roller driving unit 26 is a driving source for rotating the first roller 24. The roller driving unit 26 may be, for example, a motor. The roller driving unit 26 rotates the transport belt 21 by rotating the first roller 24. That is, the roller driving unit 26 transmits a driving force to the first roller 24 to drive the transport belt 21.

The transport unit 15 may include a pressing unit 27. The pressing unit 27 is located outside the transport belt 21. The pressing unit 27 is located to face the support surface 21A with respect to the transport belt 21. The pressing unit 27 presses the medium 99 against the transport belt 21. Thus, the medium 99 is attached to the adhesive layer 23. The pressing unit 27 sequentially attaches the medium 99 to the adhesive layer 23 as the transport belt 21 rotates. The pressing unit 27 may be, for example, a rod or a roller.

The recording unit 16 can perform recording on the medium 99 supported by the transport belt 21. The recording unit 16 may be configured to perform recording on the medium 99 by discharging liquid. The recording unit 16 may adopt a so-called ink jet method. The recording unit 16 may adopt an electrophotographic method. The electrophotographic method is a method in which an image is fixed on the medium 99 by a photosensitive unit after a solid toner is applied.

The recording unit 16 includes a head 30. The head 30 can discharge liquid onto the medium 99 supported by the transport belt 21. The head 30 includes a plurality of nozzles 31 and a nozzle surface 32. Each of the plurality of nozzles

31 can discharge liquid. The nozzle surface 32 is a surface at which each of the plurality of nozzles 31 opens.

The recording unit 16 includes a carriage 33. The carriage 33 is configured to support the head 30. The head 30 is configured as a serial type, but may be configured as a line type. In the serial type, recording is performed while the head 30 moves in the width direction X. In the line type, the head 30 extends in the width direction X.

The recording unit 16 includes a carriage support unit 34 and a carriage driving unit (not illustrated). The carriage support unit 34 is configured to extend in the width direction X. The carriage support unit 34 supports the carriage 33 to be movable in the width direction X. The carriage driving unit is a driving source for moving the carriage 33 in the width direction X. The carriage drive unit may be, for example, a motor.

The cleaning unit 17 is located outside the transport belt 21. The cleaning unit 17 is located to face the first surface 22A with respect to the base 22. The cleaning unit 17 may be located on the lower side Z2 with respect to the transport belt 21. The cleaning unit 17 cleans the adhesive layer 23 in order to remove liquid adhering to the adhesive layer 23.

The drying unit 18 is located outside the transport belt 21. The drying unit 18 is located to face the first surface 22A with respect to the base 22. The drying unit 18 may be located on the lower side Z2 with respect to the transport belt 21. The drying unit 18 dries the adhesive layer 23 wet with a cleaning liquid by cleaning of the cleaning unit 17. The drying unit 18 may dry the adhesive layer 23 by blowing hot air to the transport belt 21 from the lower side Z2. The drying unit 18 sequentially dries the adhesive layer 23 wet with the cleaning liquid by rotating the transport belt 21.

The projection unit 19 is configured to irradiate the support surface 21A with light. The projection unit 19 can project an image onto the support surface 21A. In particular, the projection unit 19 is configured to project a reference position image onto the support surface 21A. The reference position image is an image that indicates a reference position of the medium 99 supported by the support surface 21A. In particular, the reference position image is an image that enables identification of a reference position of an end portion in the width direction X of the medium 99 supported by the support surface 21A.

The control unit 20 controls the recording apparatus 10. The control unit 20 controls various operations performed by the recording apparatus 10. The control unit 20 may be configured as a circuit including a: one or more processors that perform various processing according to a computer program, one or more dedicated hardware circuits that perform at least a part of the various processing, or y: a combination thereof. The hardware circuit is, for example, an application-specific integrated circuit. A processor includes a CPU and a memory such as a RAM and a ROM which stores program code or instructions configured to cause the CPU to perform processing. The memory, that is, a computer-readable medium, includes any readable medium that can be accessed by a general purpose or special purpose computer.

In particular, the control unit 20 is coupled to the roller driving unit 26, a carriage driving unit (not illustrated), the head 30, the cleaning unit 17, the drying unit 18, and the projection unit 19. The control unit 20 outputs a control signal to control the roller driving unit 26, the carriage driving unit (not illustrated), the head 30, the cleaning unit 17, the drying unit 18, and the projection unit 19. A location at which the control unit 20 is disposed is not particularly limited. The control unit 20 may include functional units such as the medium collection unit 14, the drying unit 18, and the projection unit 19.

Detailed Configuration of Projection Unit 19

Next, the projection unit 19 will be described with reference to FIG. 2.

Figure 2:
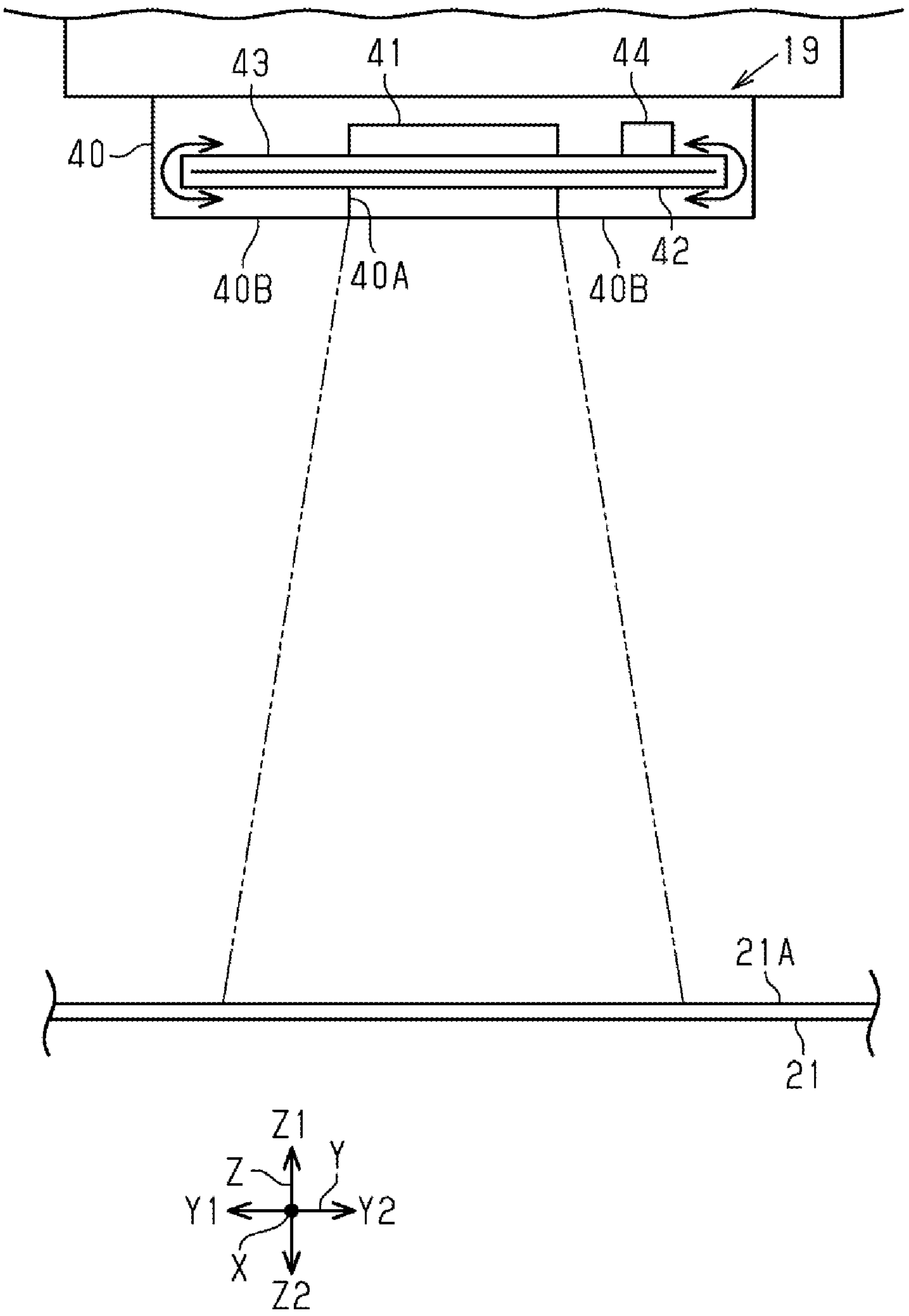
FIG. 2 is a side view illustrating a projection unit.

As illustrated in FIG. 2, the projection unit 19 includes a main body 40, an irradiation unit 41, and a light blocking portion 42. The main body 40 is configured to accommodate the irradiation unit 41 and the light blocking portion 42. The main body 40 includes an opening portion 40A and a light blocking frame 40B.

The opening portion 40A is provided between the light blocking portion 42 and the support surface 21A in the vertical direction Z. The opening portion 40A is configured to expose a partial region of the light blocking portion 42. The projection unit 19 is configured to project light emitted from the irradiation unit 41 onto the support surface 21A via the opening portion 40A and the light blocking portion 42.

The light blocking frame 40B is provided between the light blocking portion 42 and the support surface 21A in the vertical direction Z. The light blocking frame 40B is provided at a peripheral edge of the opening portion 40A. In other words, the light blocking frame 40B is a member in which the opening portion 40A opens. The light blocking frame 40B is configured to cover a partial region of the light blocking portion 42. The light blocking frame 40B forms an outer edge of a projection region projected onto the support surface 21A. The light blocking frame 40B does not project an unnecessary image onto the support surface 21A by covering a region that does not need to be projected onto the support surface 21A in the entire region of the light blocking portion 42.

The main body 40 includes a holding unit 43 capable of holding the light blocking portion 42. The holding unit 43 holds the light blocking portion 42 to be movable with respect to the irradiation unit 41. The holding unit 43 holds the light blocking portion 42 so that the light blocking portion 42 is movable in the forward-rearward direction Y. The holding unit 43 may include a roller that movably holds the light blocking portion 42.

The irradiation unit 41 is located on the upper side Z1 of the support surface 21A. The irradiation unit 41 is located on the upper side Z1 of the light blocking portion 42. The irradiation unit 41 is located on the upper side Z1 of the support surface 21A with the light blocking portion 42 interposed therebetween. The irradiation unit 41 can irradiate the support surface 21A with light.

The light blocking portion 42 is located between the irradiation unit 41 and the support surface 21A in the vertical direction Z. The light blocking portion 42 includes at least one light blocking region. The at least one light blocking region is a region that blocks a part of the light emitted from the irradiation unit 41. The light blocking portion 42 may include at least one light transmitting region. In other words, one light blocking portion 42 includes at least one light blocking region and at least one light transmitting region. The light blocking portion 42 may be a transparent film in which a light blocking region provided. The light blocking portion 42 may be provided in an endless shape.

The light blocking portion 42 is held by the holding unit 43 to be movable in the forward-rearward direction Y with respect to the irradiation unit 41. The light blocking portion 42 can change the region of the light blocking portion 42 exposed from the opening portion 40A by moving in the forward-rearward direction Y. The light blocking portion 42 can change the light blocking region exposed from the opening portion 40A by moving in the forward-rearward direction Y. In this way, the projection unit 19 can project the reference position image onto the support surface 21A by blocking a part of the light emitted by the irradiation unit 41 with the light blocking region of the light blocking portion 42.

The projection unit 19 includes a position detection unit 44. The position detection unit 44 can detect a position of the light blocking portion 42. The position detection unit 44 may be configured of one or a plurality of sensors. The position detection unit 44 may detect the position of the light blocking portion 42 by detecting a detection target provided in the light blocking portion 42. The position detection unit 44 is coupled to the control unit 20. The position detection unit 44 outputs a detection signal to the control unit 20.

Detailed Configuration of Irradiation Unit 41

Next, the irradiation unit 41 will be described with reference to FIG. 3.

Figure 3:
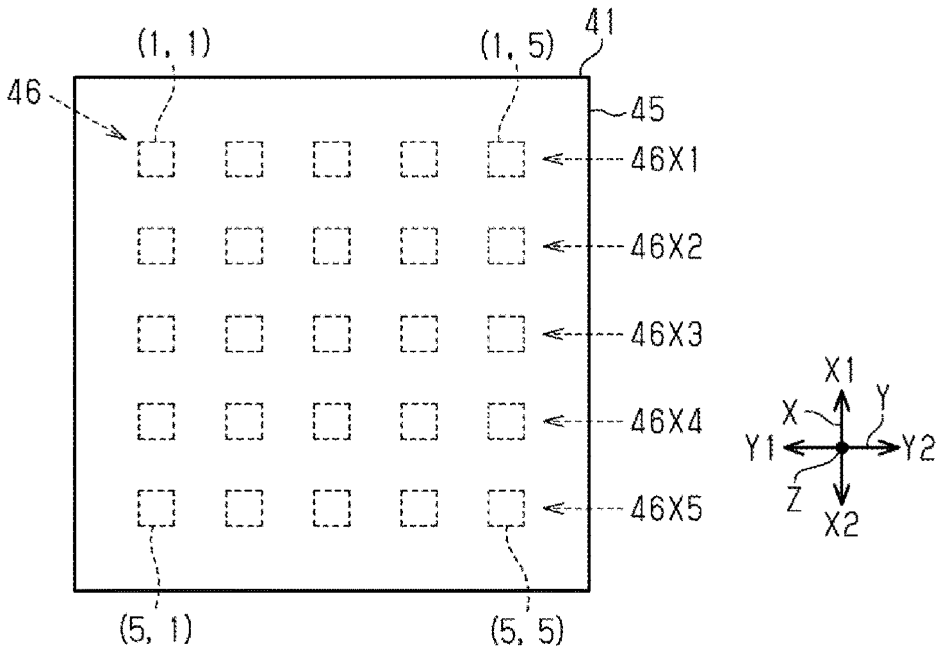
FIG. 3 is a top view illustrating an irradiation unit.

As illustrated in FIG. 3, the irradiation unit 41 includes a substrate 45 and a plurality of light sources 46. Each of the plurality of light sources 46 is provided at a bottom surface of the substrate 45. That is, each of the plurality of light sources 46 is provided at a surface facing the support surface 21A of the substrate 45.

The plurality of light sources 46 are provided in a matrix shape in the width direction X and the forward-rearward direction Y. In order to facilitate understanding of the disclosure, the plurality of light sources 46 are arranged in a matrix of five light sources in the width direction X and five light sources in the forward-rearward direction Y, but the disclosure is not limited thereto.

Hereinafter, it may be referred to as a light source 46 of coordinates (x,y). The light sources 46 at the coordinates (1,1) to (1,5) may be referred to as light sources 46X1 in a first column. The light sources 46 at the coordinates (2,1) to (2,5) may be referred to as light sources 46X2 in a second column. Similarly, the light sources 46 at the respective coordinates may be indicated as light sources 46X3 in a third column to light sources 46X5 in a fifth column.

Each of the plurality of light sources 46 is coupled to the control unit 20. Each of the plurality of light sources 46 is turned on or off by a control signal from the control unit 20. Each of the plurality of light sources 46 can be turned on at any light emission intensity among a plurality of levels of light emission intensity by a control signal from the control unit 20. Specifically, each of the plurality of light sources 46 may be capable of being turned on at any one of light emission intensities of a low intensity, a medium intensity, and a high intensity by a control signal from control unit 20.

Detailed Configuration of Support Surface 21A

Next, the support surface 21A onto which an image is projected will be described with reference to FIG. 4.

Figure 4:
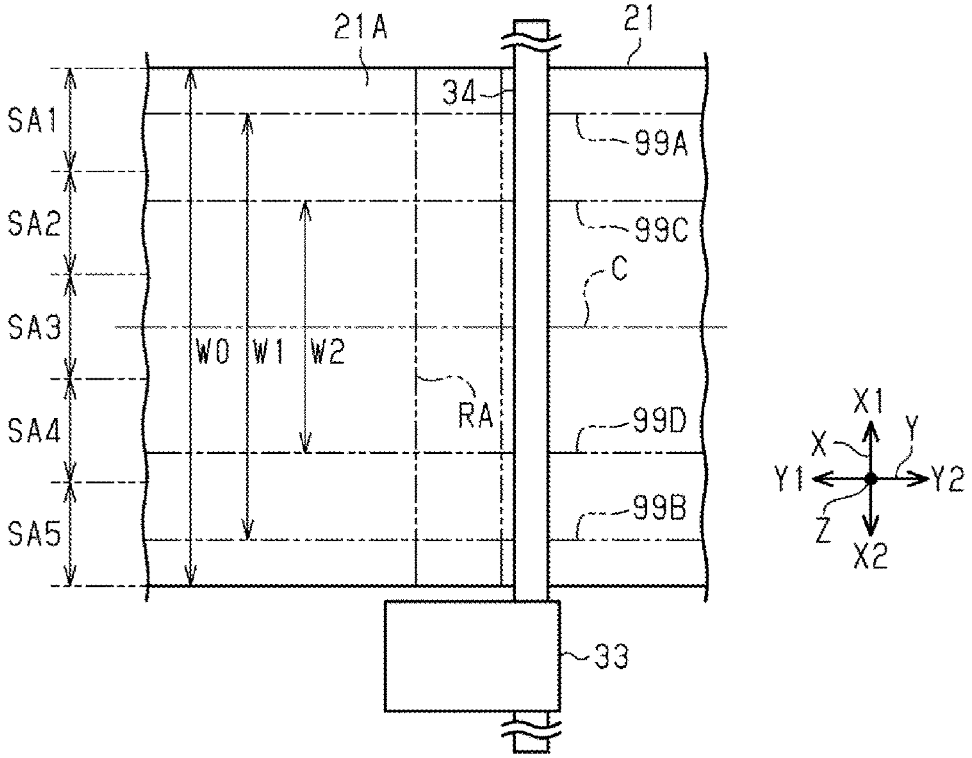
FIG. 4 is a top view illustrating a supporting surface.

As illustrated in FIG. 4, the support surface 21A has a width W0 in the width direction X about a center line C in the width direction X. The support surface 21A is a surface including a recording region RA. The support surface 21A can transport a plurality of types of medium 99 having different widths in the width direction X.

As a specific example, the support surface 21A can support the wide medium 99 and the narrow medium 99. The wide medium 99 has a first width W1 in the width direction X about the center line C. The first width W1 is shorter than the width W0. The wide medium 99 includes a first end portion 99A in the first width direction X1 and a second end portion 99B in the second width direction X2.

The narrow medium 99 has a second width W2 in the width direction X about the center line C. The second width W2 is shorter than the first width W1. The narrow medium 99 includes a third end portion 99C in the first width direction X1 and a fourth end portion 99D in the second width direction X2.

When the support surface 21A is divided into five regions in the width direction X and the regions are referred to as a first support region SA1 to a fifth support region SA5 in order from the first width direction X1 side, the first end portion 99A is located in the first support region SA1. The second end portion 99B is located in the fifth support region SA5. The third end portion 99C is located in the second support region SA2. The fourth end portion 99D is located in the fourth support region SA4.

Detailed Configuration of Light Blocking Portion 42

Next, the light blocking portion 42 will be described with reference to FIGS. 5 to 8.

As illustrated in FIGS. 5 to 8, the light blocking portion 42 includes a plurality of projection regions 42A to 42D. Each of the plurality of projection regions 42A to 42D is a region corresponding to an image projected onto the support surface 21A. In the light blocking portion 42, any one of the plurality of projection regions 42A to 42D can be exposed from the opening portion 40A. In this way, the image corresponding to the projection region exposed from the opening portion 40A is projected onto the support surface 21A.

Figure 5:
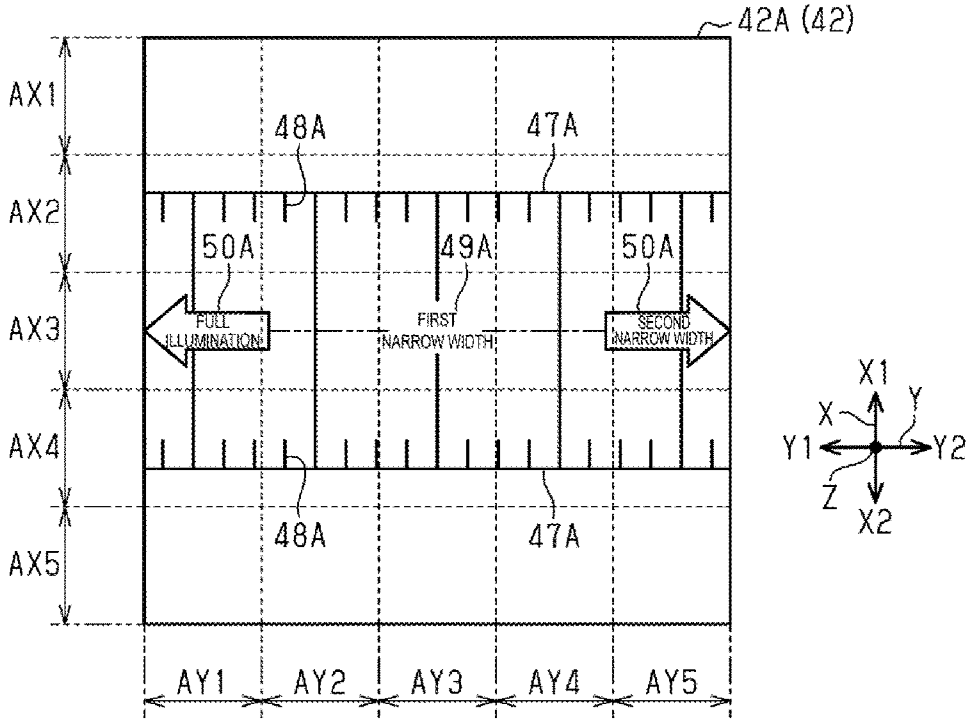
FIG. 5 is a schematic side view illustrating a light blocking portion.
Figure 6:
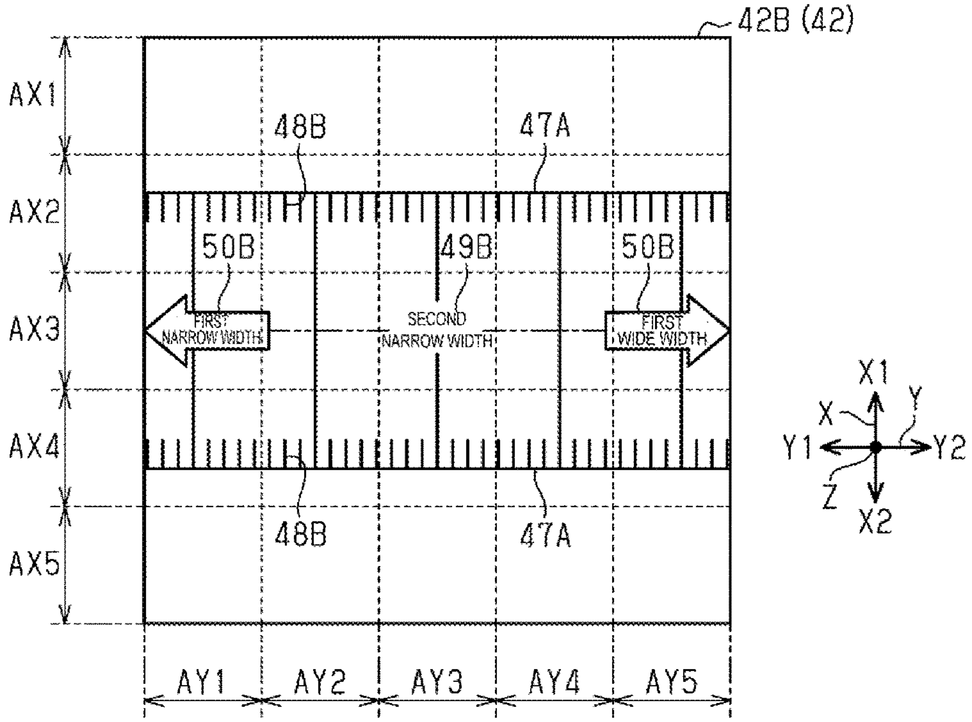
FIG. 6 is a schematic side view illustrating a light blocking portion.
Figure 7:
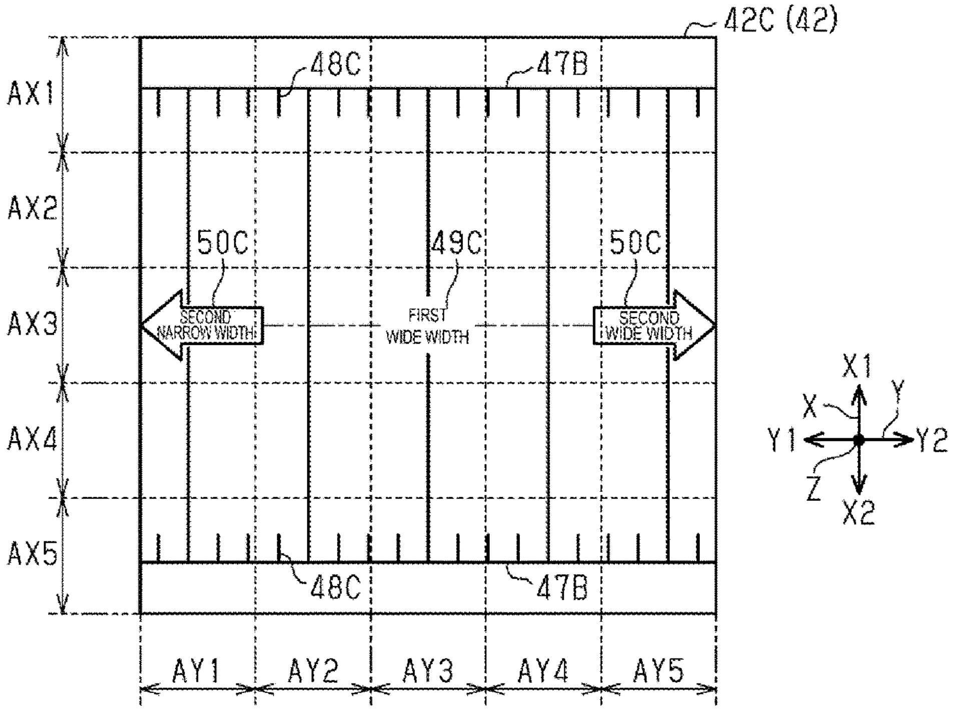
FIG. 7 is a schematic side view illustrating a light blocking portion.
Figure 8:
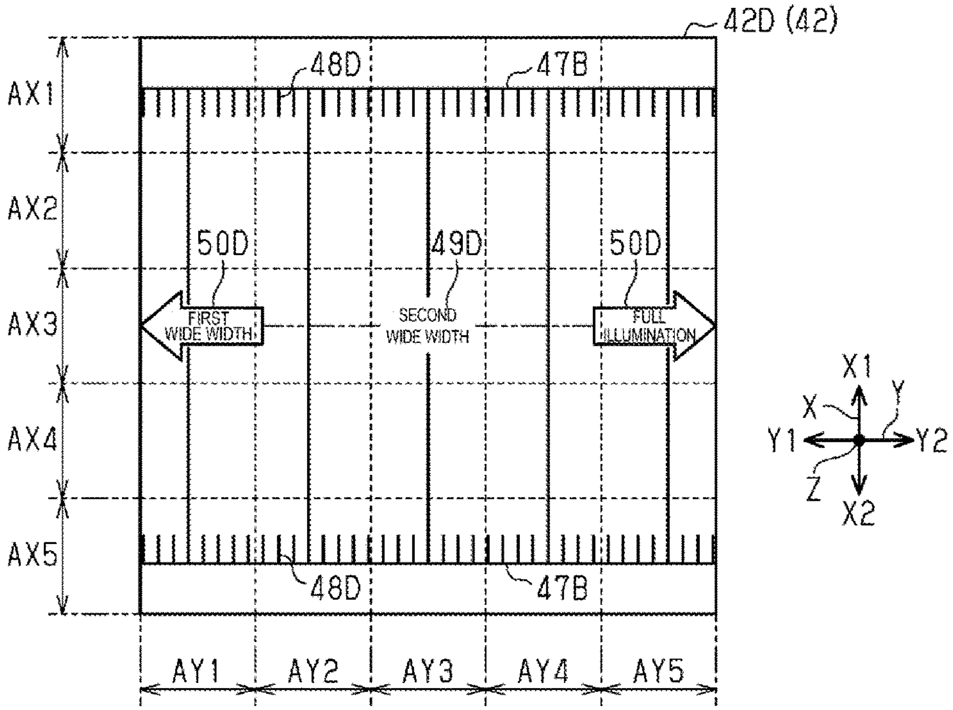
FIG. 8 is a schematic side view illustrating a light blocking portion.

The light blocking portion 42 may include a first projection region 42A illustrated in FIG. 5, a second projection region 42B illustrated in FIG. 6, a third projection region 42C illustrated in FIG. 7, and a fourth projection region 42D illustrated in FIG. 8 as the plurality of projection regions 42C to 42D. The light blocking portion 42 may include a non-projection region (not illustrated) in which an image is not projected onto the support surface 21A, in addition to the plurality of projection regions 42A to 42D. The non-projection region is configured of a light transmitting region of the light blocking portion 42. Therefore, when the light from the light source 46 passes through the light transmitting region of the light blocking portion 42, the support surface 21A is irradiated with the light without projecting an image onto the support surface 21A.

The control unit 20 can select and perform any projection mode among a plurality of projection modes. The projection mode is an example of a mode. Each of the plurality of projection regions 42A to 42D is a projection region corresponding to a respective one of the plurality of projection modes. The plurality of projection modes may include a first narrow mode, a second narrow mode, a first wide mode, and a second wide mode. The projection mode may include a full illumination mode. The non-projection region includes a region corresponding to the full illumination mode.

The first narrow mode is a mode in which an image is projected onto the support surface 21A when recording is performed on the medium 99 that is narrow in the width direction X. The second narrow mode is a mode in which the light emission intensity is higher than that in the first narrow mode. The first wide mode is a mode in which an image is projected onto the support surface 21A when recording is performed on the medium 99 that is wide in the width direction X. The second wide mode is a mode in which the light emission intensity is higher than that in the first wide mode. The full illumination mode is a mode in which the entire region is irradiated without projecting an image onto the support surface 21A.

Each of the plurality of projection regions 42A to 42D is a projection region for projecting the reference position image in the corresponding projection mode. The reference position image may include an end portion image extending in the forward-rearward direction Y. The reference position image may include a scale image extending in the width direction X. The end portion image and the scale image are projected onto the support surface 21A by, for example, irradiating a transparent film on which marks corresponding to the end portion image and the scale image are formed in advance. The marks corresponding to the end portion image and the scale image may be formed at the transparent film by printing black paint.

Further, each of the plurality of projection regions 42A to 42D is also a region for projecting a current mode image. The current mode image is an image indicating a current projection mode. Each of the plurality of projection regions 42A to 42D is also a region for projecting a change mode image. The change mode image is an image indicating a changed projection mode and a change operation direction.

The current mode image and the change mode image will be described in detail. The current mode image is an image for allowing a user to easily recognize a currently selected projection mode among the plurality of projection modes. The current mode image is projected onto the support surface 21A by irradiating a transparent film on which characters corresponding to a type of the currently selected projection mode are formed in advance, for example. The characters corresponding to the type of the currently selected projection mode may be formed at the transparent film by printing black paint.

The change mode image is an image for allowing the user to easily recognize a direction in which the light blocking portion 42 is moved. The user performs a change operation in order to change the image projected onto the support surface 21A from the current mode image to an image different from the current mode image. The change operation direction is a direction in which the light blocking portion 42 is to be moved when the user performs the change operation. As will be described below, the change mode image is projected onto the support surface 21A by irradiating a transparent film on which, for example, an arrow indicating the change operation direction and characters indicating the change mode are formed in advance. The characters indicating the change mode is a mode after the light blocking portion 42 is moved in the direction indicated by the arrow. The arrow indicating the change operation direction and the characters indicating the change mode may be formed at the transparent film by printing black paint.

As illustrated in FIG. 5, the first projection region 42A is a projection region for projecting an image onto the support surface 21A in the first narrow mode. The first projection region 42A includes a light blocking region for projecting the reference position image. Specifically, the first projection region 42A includes a first end light blocking region 47A for projecting an end portion image that enables identification of the third end portion 99C and the fourth end portion 99D illustrated in FIG. 4. The first end light blocking region 47A is a pair of linear patterns extending in the forward-rearward direction Y. The first projection region 42A includes a first scale light blocking region 48A for projecting a scale image provided at every first interval. The first scale light blocking region 48A is a plurality of linear patterns extending in the width direction X from the first end light blocking region 47A and arranged in the forward-rearward direction Y.

When the first projection region 42A is divided into five regions in the width direction X and the five regions are referred to as a first region AX1 to a fifth region AX5 in order from the first width direction X1 side, the first end light blocking region 47A is located in the second region AX2 and the fourth region AX4. Further, the first scale light blocking region 48A is located mainly in the second region AX2 and the fourth region AX4.

Each of the first region AX1 to the fifth region AX5 may be a region in which an image is projected onto the corresponding one of the support regions SA1 to SA5 by blocking a part of the light from the light sources 46X1 to 46X5 in the corresponding one of the columns. Specifically, the first region AX1 is a region in which an image is projected onto the first support region SA1 mainly by blocking a part of the light from the light sources 46X1 in the first column. The second region AX2 is a region in which an image is projected onto the second support region SA2 mainly by blocking a part of the light from the light sources 46X2 in the second row. The third region AX3 is a region in which an image is projected onto the third support region SA3 mainly by blocking a part of the light from the light sources 46X3 in the third column. The fourth region AX4 is a region in which an image is projected onto the fourth support region SA4 mainly by blocking a part of the light from the light sources 46X4 in the fourth column. The fifth region AX5 is a region in which an image is projected onto the fifth support region SA5 mainly by blocking a part of light from the light sources 46X5 in the fifth column.

The first projection region 42A includes a first current mode light blocking region 49A. The first current mode light blocking region 49A is a region for projecting a current mode image. In the embodiment, the current mode image corresponding to the first narrow mode is projected by irradiating a transparent film on which characters "first narrow width" are formed in advance. As described above, the characters "first narrow width" may be formed at the transparent film by printing black paint. That is, as the characters "first narrow width" are printed on the transparent film, the first current mode light blocking region 49A is formed at the transparent film. When the first projection region 42A is divided into five regions in the forward-rearward direction Y and the five regions are referred to as a sixth region AY1 to a tenth region AY5 in order from the front side Y1, the first current mode light blocking region 49A is located in a region which is the third region AX3 and the eighth region AY3. Thus, the projection unit 19 can project the current mode image onto the support surface 21A.

The first projection region 42A includes a first change mode light blocking region 50A. The first change mode light blocking region 50A is a region for projecting a change mode image. In the embodiment, the change mode image corresponding to the full illumination mode is projected onto the support surface 21A by irradiating a transparent film on which a change mode mark in which characters "full illumination" indicating the change mode are disposed inside the arrow is formed in advance. As described above, the change mode mark may be formed at the transparent film by printing black paint. That is, as the change mode mark is printed on the transparent film, the first change mode light blocking region 50A is formed at the transparent film. With such a configuration, the change operation direction and the change mode are associated with each other, and the user can easily distinguish the change mode image from the current mode image. The first change mode light blocking region 50A is located in a region which is the third region AX3 and the sixth region AY1 and a region which is the third region AX3 and the tenth region AY5. Thus, the projection unit 19 can project the change mode image onto the support surface 21A.

As illustrated in FIG. 6, the second projection region 42B is a projection region for projecting the reference position image in the second narrow mode. Description of the configuration of the second projection region 42B that is the same as that of the first projection region 42A will be omitted. Unlike the first projection region 42A, the second projection region 42B includes a second scale light blocking region 48B for projecting a scale image provided at every second interval. The second interval is shorter than the first interval.

The second projection region 42B includes a second current mode light blocking region 49B. The second current mode light blocking region 49B is a region for projecting a current mode image. The second current mode light blocking region 49B is located in a region that is the third region AX3 and the eighth region AY3. A design and a forming method of the second current mode light blocking region 49B are the same as those of the first current mode light blocking region 49A.

The second projection region 42B includes a second change mode light blocking region 50B. The second change mode light blocking region 50B is a region for projecting a change mode image. The second change mode light blocking region 50B is located in a region which is the third region AX3 and the sixth region AY1 and a region which is the third region AX3 and the tenth region AY5. A design and a forming method of the second change mode light blocking region 50B are the same as those of the first change mode light blocking region 50A.

As illustrated in FIG. 7, the third projection region 42C is a projection region for projecting the reference position image in the first wide mode. The third projection region 42C includes a second end light blocking region 47B for projecting an end portion image that enables identification of the first end portion 99A and the second end portion 99B illustrated in FIG. 4. The third projection region 42C includes a third scale light blocking region 48C for projecting a scale image provided at every first interval.

When the third projection region 42C is divided into five regions in the width direction X, and the five regions are referred to as a first region X1 to a fifth region AX5 in order from the first width direction X1 side, the second end light blocking region 47B is located in the first region AX1 and the fifth region AX5. Further, the third scale light blocking region 48C is located mainly in the first region AX1 and the fifth region AX5.

The third projection region 42C includes a third current mode light blocking region 49C. The third current mode light blocking region 49C is a region for projecting a current mode image. The third current mode light blocking region 49C is located in a region that is the third region AX3 and the eighth region AY3. A design and a forming method of the third current mode light blocking region 49C are the same as those of the first current mode light blocking region 49A.

The third projection region 42C includes a third change mode light blocking region 50C. The third change mode light blocking region 50C is a region for projecting a change mode image. The third change mode light blocking region 50C is located in a region which is the third region AX3 and the sixth region AY1 and a region which is the third region AX3 and the tenth region AY5. A design and a forming method of the third change mode light blocking region 50C are the same as those of the first change mode light blocking region 50A.

As illustrated in FIG. 8, the fourth projection region 42D is a projection region for projecting the reference position image in the second wide mode. Description of the configuration of the fourth projection region 42D that is the same as that of the third projection region 42C will be omitted. Unlike the third projection region 42C, the fourth projection region 42D includes a fourth scale light blocking region 48D for projecting a scale image provided at every second interval.

The fourth projection region 42D includes a fourth current mode light blocking region 49D. The fourth current mode light blocking region 49D is a region for projecting a current mode image. The fourth current mode light blocking region 49D is located in a region that is the third region AX3 and the eighth region AY3. A design and a forming method of the fourth current mode light blocking region 49D are the same as those of the first current mode light blocking region 49A.

The fourth projection region 42D includes a fourth change mode light blocking region 50D. The fourth change mode light blocking region 50D is a region for projecting a change mode image. The fourth change mode light blocking region 50D is located in a region which is the third region AX3 and the sixth region AY1 and a region which is the third region AX3 and the tenth region AY5. A design and a forming method of the fourth change mode light blocking region 50D are the same as those of the first change mode light blocking region 50A.

At least any combination of the light blocking regions of the first projection region 42A to the fourth projection region 42D may be an example of a combination of the first light blocking region and the second light blocking region. Further, the reference position image formed by the first light blocking region corresponds to an example of a first reference position image, and the reference position image formed by the second light blocking region corresponds to an example of a second reference position image. That is, it can be said that the first light blocking region is a light blocking region for forming the first reference position image, and the second light blocking region is a light blocking region for forming the second reference position image. Further, the first reference position image and the second reference position image are different images.

Projection Control Processing

Here, a projection control processing will be described with reference to FIG. 9. The projection control processing is processing performed by the control unit 20 at predetermined intervals.

As illustrated in FIG. 9, in Step S11, the control unit 20 performs a light blocking position detection processing. In this processing, the control unit 20 detects a position of the light blocking portion 42 based on a detection signal from the position detection unit 44.

Specifically, the control unit 20 can detect that the light blocking portion 42 is disposed at a position at which the first projection region 42A is exposed from the opening portion 40A. The control unit 20 can detect that the light blocking portion 42 is disposed at a position at which the non-projection region is exposed from the opening portion 40A. When this processing ends, the processing proceeds to Step S12.

In Step S12, the control unit 20 performs mode determination processing. In this processing, the control unit 20 determines the projection mode based on the position of the light blocking portion 42 detected in Step S11. In this way, the control unit 20 can perform control to any one of the plurality of types of projection modes.

Specifically, when it is determined that the light blocking portion 42 is disposed at a position at which the first projection region 42A is exposed from the opening portion 40A, the control unit 20 determines the first narrow mode as the projection mode. When it is determined that the light blocking portion 42 is disposed at a position at which the non-projection region is exposed from the opening portion 40A, the control unit 20 determines the full illumination mode as the projection mode. When this processing ends, the processing proceeds to Step S13.

In Step S13, the control unit 20 performs light source control processing. In this processing, the control unit 20 controls each of the plurality of light sources 46 so as to correspond to the projection mode determined in Step S12.

In particular, the control unit 20 refers to irradiation control information illustrated in FIG. 10 and controls each of the plurality of light sources 46 so as to correspond to the projection mode. That is, the control unit 20 controls the irradiation unit 41 based on the irradiation control information. It can also be said that the control unit 20 controls the irradiation unit 41 based on results detected by the position detection unit 44. When this processing ends, the projection control processing ends.

Irradiation Control Information

As illustrated in FIG. 10, the irradiation control information is information that enables identification of irradiation control content corresponding to the projection mode. The irradiation control information is information in which the projection mode and the irradiation control content correspond to each other. The irradiation control content is information in which each of the plurality of light sources 46 corresponds to the control content. The control content includes turning on at a low intensity, turning on at a medium intensity, and turning on and off at a high intensity.

Specifically, the full illumination mode corresponds to the control content for turning on all of the plurality of light sources 46 at the low intensity. Thus, the control unit 20 controls the irradiation unit 41 so as to turn on all of the plurality of light sources 46 at the low intensity. As described above, in the full illumination mode, the support surface 21A is uniformly irradiated with the light from the irradiation unit 41. In the full illumination mode, no image is projected onto the support surface 21A.

The first narrow mode corresponds to the control content for turning on the light sources 46X2 in the second column and the light sources 46X4 in the fourth column at the medium intensity. Thus, the control unit 20 controls the irradiation unit 41 to turn on the light sources 46X2 in the second column and the light sources 46X4 in the fourth column at the medium intensity. As described above, in the first narrow mode, the reference position image is projected mainly onto the second support region SA2 and the fourth support region SA4.

The first narrow mode corresponds to the control content for turning on the light source 46 at the coordinates (3,1), the light source 46 at the coordinates (3,3), and the light source 46 at the coordinates (3,5) at the low intensity. Thus, the control unit 20 controls the irradiation unit 41 so as to turn on the light source 46 at the coordinates (3,1), the light source 46 at the coordinates (3,3), and the light source 46 at the coordinates (3,5) at the low intensity. As described above, in the first narrow mode, the current mode image and the change mode image are projected onto the third support region SA3.

The first narrow mode corresponds to the control content for turning off the light sources 46X1 in the first column, the light sources 46X5 in the fifth column, the light source 46 at the coordinates (3,2), and the light source 46 at the coordinates (3,4). Thus, the control unit 20 controls the irradiation unit 41 to turn off the light sources 46X1 in the first column, the light sources 46X5 in the fifth column, the light source 46 at the coordinates (3,2), and the light source 46 at the coordinates (3,4). As described above, in the first narrow mode, since the light sources 46 that do not correspond to the projection positions of the reference position image, the current mode image, and the change mode image are turned off, the reference position image, the current mode image, and the change mode image can be clearly projected.

Unlike the first narrow mode, the second narrow mode corresponds to the control content for turning on the light sources 46X2 in the second column and the light sources 46X4 in the fourth column at the high intensity. Thus, the control unit 20 controls the irradiation unit 41 to turn on the light sources 46X2 in the second column and the light sources 46X4 in the fourth column at the high intensity. As described above, in the second narrow mode, the reference position image is clearly projected mainly onto the second support region SA2 and the fourth support region SA4. In particular, in the second narrow mode, a scale image having a narrower interval than that in the first narrow mode is also clearly projected.

Unlike the first narrow mode, the first wide mode corresponds to the control content for turning on the light sources 46X1 in the first column and the light sources 46X5 in the fifth column at the medium intensity. As a result, the control unit 20 controls the irradiation unit 41 to turn on the light sources 46X1 in the first column and the light sources 46X5 in the fifth column at the medium intensity. As described above, in the first wide mode, the reference position image is mainly projected onto the first support region SA1 and the fifth support region SA5.

Unlike the first narrow mode, the first wide mode corresponds to the control content for turning off the light sources 46X2 in the second row, the light sources 46X4 in the fourth row, the light source 46 at the coordinates (3,2), and the light source 46 at the coordinates (3,4). Thus, the control unit 20 controls the irradiation unit 41 to turn off the light sources 46X2 in the second column, the light sources 46X4 in the fourth column, the light source 46 at the coordinates (3,2), and the light source 46 at the coordinates (3,4). As described above, in the first wide mode, since the light sources 46 that do not correspond to the projection positions of the reference position image, the current mode image, and the change mode image are turned off, the reference position image, the current mode image, and the change mode image can be clearly projected.

Unlike the first wide mode, the second wide mode corresponds to the control content for turning on the light sources 46X1 in the first column and the light sources 46X5 in the fifth column at the high intensity. Thus, the control unit 20 controls the irradiation unit 41 to turn on the light sources 46X1 in the first column and the light sources 46X5 in the fifth column at the high intensity. As described above, in the second wide mode, the reference position image is clearly projected mainly onto the first support region SA1 and the fifth support region SA5. In particular, in the second wide mode, a scale image having a narrower interval than those in the first wide mode are also clearly projected.

Positional Relationship Between Light Source 46 and Light Blocking Portion 42

Next, a positional relationship between the light source 46 and the light blocking portion 42 will be described with reference to FIGS. 11 and 12.

Figure 11:
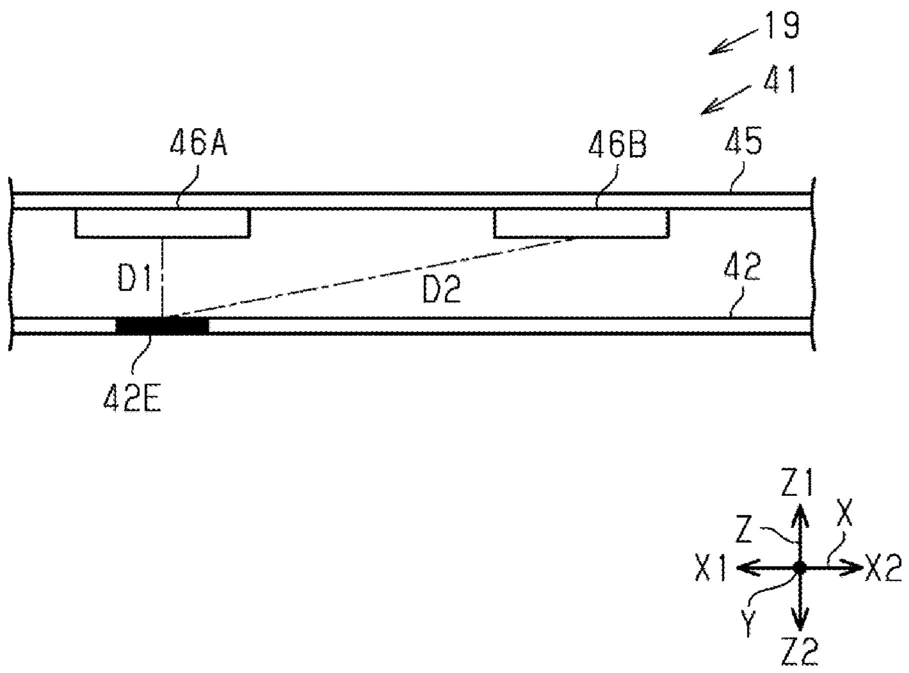
FIG. 11 is a schematic view illustrating a light source and a light blocking portion.
Figure 12:
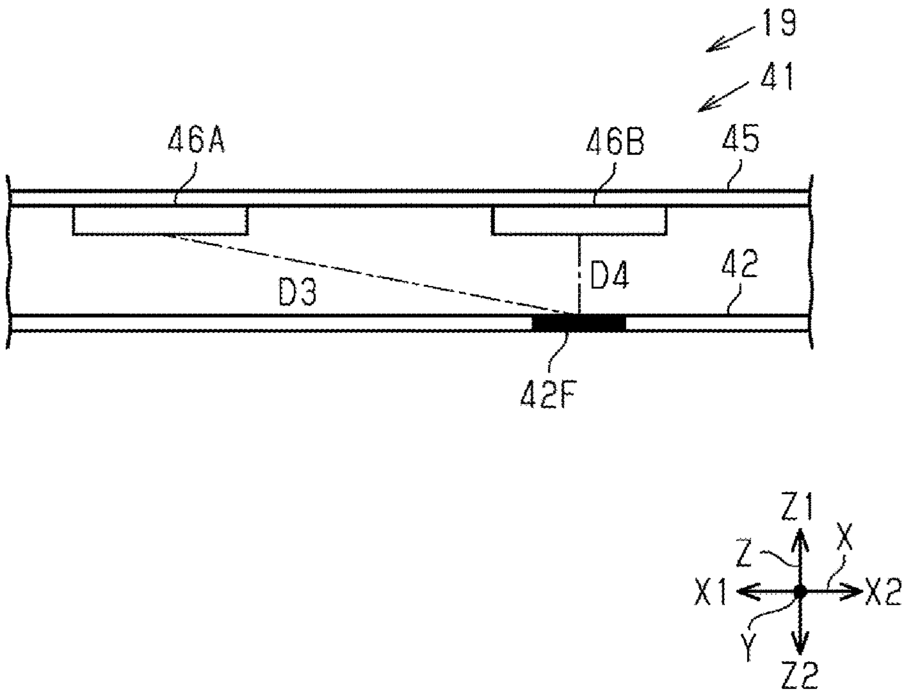
FIG. 12 is a schematic view illustrating a light source and a light blocking portion.

As illustrated in FIGS. 11 and 12, the plurality of light sources 46 include a first light source 46A and a second light source 46B. That is, the irradiation unit 41 includes the first light source 46A and the second light source 46B. Among the plurality of light sources 46, the first light source 46A and the second light source 46B will be described as representatives. The first light source 46A and the second light source 46B are provided at positions adjacent to each other in the width direction X. The first light source 46A may be a light source at the coordinates (3,1), and the second light source 46B may be a light source at the coordinates (3,2).

As illustrated in FIG. 11, the light blocking portion 42 includes a first light blocking region 42E. The first light blocking region 42E may be a light blocking region for projecting the reference position image on the support surface 21A. In particular, the first light blocking region 42E may be a light blocking region for projecting an end portion image indicating a reference position of the first end portion 99A of the medium 99 onto the support surface 21A. The first light blocking region 42E may be a light blocking region corresponding to the first wide mode or the second wide mode.

When the light blocking portion 42 is disposed at a position corresponding to the first wide mode or the second wide mode, the first light blocking region 42E is disposed at a position separated from the first light source 46A by a first distance D1 and separated from the second light source 46B by a second distance D2. The first distance D1 is shorter than the second distance D2. In other words, the first light source 46A is located so that a distance between the first light sources 46A and the first light blocking regions 42E is the first distance D1. The second light source 46B is located so that a distance between the second light source 46B and the first light blocking region 46E is the second distance D2 longer than the first distance D1. The distance between the light blocking region and the light source will be described with reference to a linear distance between a center position of the light blocking region in the width direction X and a center position of the light source in the width direction X.

In such a case, the first light source 46A close to the first light blocking region 42E is turned on, and the second light source 46B far from the first light blocking region 42E is turned off. In other words, the first wide mode and the second wide mode are modes in which the first light source 46A is turned on and the second light source 46B is turned off. At least one of the first wide mode or the second wide mode corresponds to an example of a second mode.

As illustrated in FIG. 12, the light blocking portion 42 includes a second light blocking region 42F. The second light blocking region 42F may be a light blocking region for projecting the reference position image onto the support surface 21A. In particular, the second light blocking region 42F may be a light blocking region for projecting an end portion image indicating a reference position of the second end portion 99B of the medium 99 onto the support surface 21A. The second light blocking region 42F may be a light blocking region corresponding to the first narrow mode or the second narrow mode.

When the light blocking portion 42 is disposed at a position corresponding to the first narrow mode or the second narrow mode, the second light blocking region 42F is disposed at a position separated from the first light source 46A by a third distance D3 and separated from the second light source 46B by a fourth distance D4. The fourth distance D4 is shorter than the third distance D3. In other words, the first light source 46A is located so that a distance between the first light source 46A and the second light blocking region 42F is the third distance D3. The second light source 46B is located so that a distance between the second light sources 46B and the second light blocking region 42F is the fourth distance D4 shorter than the third distance D3.

In such a case, the second light source 46B close to the second light blocking region 42F is turned on, and the first light source 46A far from the second light blocking region 42F is turned off. In other words, the first narrow mode and the second narrow mode are modes in which the second light source 46B is turned on and the first light source 46A is turned off.

Further, when the light blocking portion 42 is disposed at a position corresponding to the full illumination mode, the non-projection region is exposed from the opening portion 40A, and the light blocking region is not disposed. In such a case, both the first light source 46A and the second light source 46B are turned on. That is, it can be said that the full illumination mode is a mode in which both the first light source 46A and the second light source 46B are turned on. The full illumination mode corresponds to an example of a first mode.

In addition, it can be said that the holding unit 43 movably holds the light blocking portion 42 so that the light blocking region disposed at a position closest to the irradiation unit 41 including the first light source 46A and the second light source 46B is switched between the first light blocking region 42E and the second light blocking region 42F.

In addition, the control unit 20 controls the first light source 46A based on the irradiation control information so that the light emission intensity of the first light source 46A in the first wide mode and the second wide mode is higher than the light emission intensity of the first light source 46A in the full illumination mode. Thus, the first wide mode and the second wide mode are modes in which the light emission intensity of the first light source 46A is higher than that in the full illumination mode.

In addition, the control unit 20 controls the second light source 46B based on the irradiation control information so that the light emission intensity of the second light sources 46B in the first narrow mode and the second narrow mode is higher than the light emission intensity of the second light sources 46B in the full illumination mode. Thus, the first narrow mode and the second narrow mode are modes in which the light emission intensity of the second light source 46B is higher than that in the full illumination mode.

Operations and Effects of First Embodiment

Operations and effects of the first embodiment will be described.

(1) The projection unit 19 can project the reference position image onto the support surface 21A by blocking a part of the light emitted by the irradiation unit 41 in the light blocking region. Therefore, due to the light emitted by the irradiation unit 41 being used, for example, it is possible to curb an increase in a consumption amount of a liquid for recording or the like, and further, it is possible to curb a decrease in visibility of the reference position image due to, for example, deterioration over time such as wear. Therefore, it is possible to accurately place the medium 99 on the support surface 21A based on the reference position image, and it is possible to improve convenience for the user.

(2) The first light source 46A is located so that a distance from the light blocking region is the first distance D1, and the second light source 46B is located so that a distance from the light blocking region is the second distance D2 longer than the first distance D1. The control unit 20 can perform control to switch to any one of a plurality of projection modes. The plurality of projection modes include the full illumination mode, the first wide mode, and the second wide mode. The full illumination mode is a mode in which both the first light source 46A and the second light source 46B are turned on. The first wide mode and the second wide mode are modes in which the first light source 46A is turned on and the second light source 46B is turned off. Thus, it is possible to adjust an amount of light with which the support surface 21A is irradiated by controlling to the full illumination mode or controlling to the first wide mode or the second wide mode. Thus, it is possible to improve the convenience for the user.

In particular, in the full illumination mode, it is possible to uniformly irradiate the support surface 21A, and it is possible to provide a situation in which it is easy for the user to visually recognize the support surface 21A in accordance with transport of the medium 99 and recording on the medium 99. On the other hand, in the first wide mode and the second wide mode, since the first light source 46A corresponding to the light blocking region is turned on, and the second light source 46B not corresponding to the light blocking region is turned off, it is possible to curb unnecessary light going around, and it is possible to clearly project an image. Thus, it is possible to improve the convenience for the user.

(3) The light emission intensity of the first light source 46A in the first wide mode and the second wide mode is higher than the light emission intensity of the first light source 46A in the full illumination mode. Therefore, the amount of light emitted from the first light source 46A to the support surface 21A can be adjusted according to whether the control is performed in the full illumination mode, the first wide mode, or the second wide mode. Thus, it is possible to improve the convenience for the user.

(4) The light blocking portion 42 includes the plurality of projection regions 42A to 42D. Each of the plurality of projection regions 42A to 42D includes a light blocking region for projecting the reference position image. The holding unit 43 switches between the plurality of light blocking regions for projecting the reference position image as the light blocking region disposed at the position closest to the irradiation unit 41 by switching between the plurality of projection regions 42A to 42D. Therefore, the reference position image projected onto the support surface 21A can be switched by moving the light blocking portion 42. Thus, it is possible to improve the convenience for the user.

(5) The transport unit 15 can transport the medium 99 in the forward-rearward direction Y. The reference position image is an image that enables identification of the reference positions of both end portions of the medium 99 in the width direction X. Therefore, it is possible to accurately place the medium 99 on the support surface 21A based on the reference position image and also to improve the convenience for the user by aligning both end portions of the medium 99 in the width direction X with the reference position image.

(6) The holding unit 43 may be capable of moving the light blocking portion 42 in the forward-rearward direction Y. Thus, when the medium 99 which is long in the forward-rearward direction Y is transported, it is possible to move the light blocking region in the forward-rearward direction Y, and it is possible to accurately identify the reference position of the end portion of the medium 99 in the width direction X even when the light blocking portion 42 is moved in the forward-rearward direction Y. Therefore, it is possible to accurately place the medium 99 on the support surface 21A based on the reference position image, and it is possible to improve convenience for the user.

(7) The irradiation unit 41 is controlled based on the result of detection of the position of the light blocking portion 42 by the position detection unit 44. Thus, as a result of the user confirming the position of the light blocking portion 42, it is possible to save time and effort for changing the control content of the irradiation unit 41. Thus, it is possible to improve the convenience for the user.

(8) The support surface 21A is a surface at which the transport belt 21 supports the medium 99. Therefore, it is possible to identify the reference position of the medium 99 by visually recognizing the reference position image projected by the projection unit 19 even when the reference position image is not applied to the entire region of the transport belt 21. Therefore, it is possible to accurately place the medium 99 on the support surface 21A based on the reference position image, and it is possible to improve convenience for the user.

MODIFIED EXAMPLES

The embodiment can be modified and implemented as follows. The embodiment and the following modified examples can be combined and implemented within a technically consistent range.

The projection unit 19 may not project at least one of the current mode image or the change mode image. The projection unit 19 may not project at least one of the end portion image or the scale image as the reference position image. The projection unit 19 may not project the scale image onto the third support region SA3. The reference position image may be an image that enables identification of at least one end portion of the medium 99 in the width direction X.

In the projection unit 19, the plurality of light sources 46 are disposed with reference to a matrix region including five regions in the width direction X and five regions in the forward-rearward direction Y, and the control unit 20 controls the plurality of light sources 46 in accordance with the light blocking region, but there may be other than the five regions in the width direction X and the five regions in the forward-rearward direction Y. In particular, the projection unit 19 can clearly project an image by projecting the image with reference to a fine region. In addition, in the matrix shape, the number in the width direction X may be different from the number in the forward-rearward direction Y. The plurality of light sources 46 may include at least one of one light source in the width direction X or one light source in the forward-rearward direction Y. That is, the plurality of light sources 46 may not be provided in a matrix. The irradiation unit 41 may include at least one light source 46.

Each of the plurality of light sources 46 may be capable of emitting light in any one of a plurality of types of colors. The control unit 20 may control each of the plurality of light sources 46 to emit light in any one of the plurality of types of colors.

Among the plurality of light sources 46, the first light source 46A and the second light source 46B may be located in the width direction X but may not be adjacent to each other. Among the plurality of light sources 46, the first light source 46A and the second light source 46B may be located adjacent to each other in the forward-rearward direction Y. Among the plurality of light sources 46, the first light source 46A and the second light source 46B may be located in the forward-rearward direction Y but may not be adjacent to each other.

The light blocking portion 42 may have any shape. The light blocking portion 42 may be formed in a disc shape or may be rotatable. The light blocking portion 42 may rotate to switch the projection region exposed from the opening portion 40A.

The light transmitting region of the light blocking portion 42 may be colored. In the light blocking portion 42, a partial region is the light blocking region and another partial region is the light transmitting region, but the present disclosure is not limited thereto, and the entire region may be the light blocking region and may not include the light transmitting region.

The holding unit 43 may include a driving source that moves the light blocking portion 42. The holding unit 43 may include, for example, a motor as the driving source. The control unit 20 may move the light blocking portion 42 by driving the driving source. The holding unit 43 may move the light blocking portion 42 by a combination of driving of the driving source and a manual operation.

The holding unit 43 may have any configuration. The holding unit 43 may include, for example, a plurality of engagement claws. The plurality of engagement claws may be configured to hold the light blocking portion 42 by engaging with an opening provided in the light blocking portion 42.

The position detection unit 44 may detect the position of the light blocking portion 42 held by the holding unit 43 by detecting a detection target provided at the holding unit 43. The projection unit 19 may not detect the position of the light blocking portion 42, and may not include the position detection unit 44.

The projection unit 19 may include a focus adjustment unit. The focus adjustment unit may be, for example, a lens or a pinhole. The projection unit 19 may include a shutter, a wiper, an air flow blower, and the like to prevent foreign matter from adhering to a surface of the light blocking portion 42 on the lower side Z2. Thus, for example, when the liquid from the recording unit 16 is in a mist state, it is possible to curb adhesion of foreign matter to the light blocking portion 42.

The recording apparatus 10 and the medium supporting device 90 may include a notification unit. The notification unit may be a display unit that displays an image. The notification unit may be a speaker that outputs sound. The notification unit may be a light-emitting unit that emits light in a predetermined mode. The control unit 20 may cause the notification unit to notify the current projection mode.

The recording apparatus 10 and the medium supporting device 90 may include an input unit. The input unit only needs to be capable of inputting an instruction from the user. The input unit may be an operation unit operable by the user. The input unit may be an information input unit capable of inputting an instruction from a terminal device communicably coupled to the recording apparatus 10 and the medium supporting device 90. The control unit 20 may control any one of a plurality of types of projection modes based on an input from the input unit. The control unit 20 may move the light blocking portion 42 based on an input from the input unit.

The projection mode may include at least one of the first narrow mode, the second narrow mode, the first wide mode, the second wide mode, or the full illumination mode. The projection mode may include another mode in addition to the first narrow mode, the second narrow mode, the first wide mode, the second wide mode, and the full illumination mode. The projection mode may include a turn-off mode in which light is not emitted from the irradiation unit 41.

The transport unit 15 may not include the transport belt 21. In this case, the transport unit 15 may be capable of transporting the medium 99 using, for example, a transport roller.

The recording apparatus 10 and the medium supporting device 90 may include a support unit that does not move in a horizontal direction. As described above, the support surface 21A may not be included in the transport belt 21, and may be included in the support unit that does not move in the horizontal direction.

As the medium 99, for example, paper, a synthetic resin, a metal, cloth, ceramic, rubber, or a composite thereof may be used. The medium 99 may not be a long medium.

The liquid discharged by the recording unit 16 is not limited to ink, and may be, for example, a liquid material including particles of a functional material dispersed or mixed in liquid. For example, the recording unit 16 may discharge a liquid material including a material such as an electrode material or a pixel material used in manufacture of a liquid crystal display, an electroluminescent (EL) display, and a surface emitting display in a dispersed or dissolved form.

The phrase "at least one of" as used herein means one or more of desired options. As an example, the phrase "at least one of" as used herein means only one option or both of two options when the number of options is two. As another example, the phrase "at least one of" as used herein means only one option or any combination of two or more options when the number of options is three or more.

SUPPLEMENTARY NOTE

Hereinafter, technical concepts and effects thereof that are understood from the above-described embodiments and modified examples are described.

(A) A recording apparatus includes a support unit including a support surface configured to support a medium, a recording unit configured to perform recording on the medium supported by the support unit, and a projection unit configured to project an image onto the support surface, wherein the projection unit includes an irradiation unit configured to irradiate the support surface with light, and a light blocking portion configured to block a part of the light emitted from the irradiation unit, the light blocking portion includes at least one light blocking region configured to block the part of the light emitted from the irradiation unit, and the projection unit is configured to project a reference position image onto the support surface by blocking the part of the light emitted by the irradiation unit with the at least one light blocking region, the reference position image indicating a reference position of the medium supported by the support surface.

According to such a configuration, due to the light irradiated by the irradiation unit being used, for example, it is possible to curb an increase in the consumption amount of the liquid for recording or the like, and furthermore, it is possible to curb a decrease in the visibility of the reference position image due to deterioration over time. Therefore, it is possible to accurately place the medium on the support surface based on the reference position image, and it is possible to improve the convenience for the user.

(B) The recording apparatus may further include a control unit configured to control the irradiation unit, the irradiation unit may include a first light source and a second light source, the first light source may be located with a distance between the first light source and the at least one light blocking region being a first distance, the second light source may be located with a distance between the second light source and the at least one light blocking region being a second distance longer than the first distance, the control unit may be configured to perform control to switch to any one of a plurality of modes, the plurality of modes may include a first mode and a second mode, the first mode may be a mode in which both the first light source and the second light source are turned on, and the second mode may be a mode in which the first light source is turned on and the second light source is turned off.

According to such a configuration, it is possible to adjust an amount of light with which the support surface is irradiated according to whether the control is performed in the first mode or the second mode. Thus, it is possible to improve the convenience for the user.

(C) In the recording apparatus, the control unit may control the first light source so that a light emission intensity of the first light source in the second mode is higher than a light emission intensity of the first light source in the first mode.

According to such a configuration, it is possible to adjust the amount of light emitted from the first light source to the support surface according to whether the control is performed in the first mode or the second mode. Thus, it is possible to improve the convenience for the user.

(D) The recording apparatus may further include a holding unit holding the light blocking portion with the light blocking portion being movable with respect to the irradiation unit, the reference position image may include a first reference position image and a second reference position image different from the first reference position image, the at least one light blocking region may include a first light blocking region configured to form the first reference position image and a second light blocking region configured to form the second reference position image, and the holding unit may hold the light blocking portion with a light blocking region disposed at a position closest to the irradiation unit being switchable between the first light blocking region and the second light blocking region.

According to such a configuration, it is possible to switch between projecting the first reference position image onto the support surface and projecting the second reference position image onto the support surface by moving the light blocking portion. Thus, it is possible to improve the convenience for the user.

(E) The recording apparatus may further include a transport unit configured to transport the medium in a transport direction, the transport unit may be configured to transport the medium that is long in the transport direction, and when a direction intersecting the transport direction is a width direction, the reference position image may be an image that enables identification of a reference position of an end portion of the medium in the width direction.

According to such a configuration, it is possible to accurately place the medium on the support surface based on the reference position image, and it is possible to improve the convenience for the user by aligning the end portion of the medium in the width direction with the reference position image.

(F) The recording apparatus may further include a holding unit holding the light blocking portion with the light blocking portion being movable in the transport direction with respect to the irradiation unit.

According to such a configuration, when a medium which is long in the transport direction is transported, it is possible to move the light blocking region in the transport direction and to accurately identify the reference position of the end portion of the medium in the width direction even when the light blocking portion is moved in the transport direction. Therefore, it is possible to accurately place the medium on the support surface based on the reference position image, and it is possible to improve the convenience for the user.

(G) The recording apparatus may further include a position detection unit configured to detect a position of the light blocking portion, and the control unit may control the irradiation unit based on a result detected by the position detection unit.

According to such a configuration, as a result of the user confirming the position of the light blocking portion, it is possible to save time and effort for changing the control content of the irradiation unit. Thus, it is possible to improve the convenience for the user.

(H) The recording apparatus may further include a transport unit configured to transport the medium in a transport direction, the transport unit may include a transport belt configured to support the medium to be transported, the support unit may include the transport belt, and the support surface may be a surface at which the transport belt supports the medium.

According to such a configuration, it is possible to identify the reference position of the medium by visually recognizing the reference position image projected by the projection unit even when the reference position image is not applied to the entire region of the transport belt. Therefore, it is possible to accurately place the medium on the support surface based on the reference position image, and it is possible to improve the convenience for the user.

(I) A medium supporting device includes a support unit including a support surface configured to support a medium being a recording target, and a projection unit configured to project an image onto the support surface, wherein the projection unit includes an irradiation unit configured to irradiate the support surface with light, and a light blocking portion configured to block a part of the light emitted from the irradiation unit, the light blocking portion includes at least one light blocking region configured to block the part of the light emitted from the irradiation unit, and the projection unit is configured to project a reference position image onto the support surface by blocking the part of the light emitted by the irradiation unit with the at least one light blocking region, the reference position image indicating a reference position of the medium supported by the support surface. According to such a configuration, the same effect as (A) can be obtained.

What is claimed is:

1. A recording apparatus comprising:

a support unit including a support surface configured to support a medium;

a recording unit configured to perform recording on the medium supported by the support unit;

a projection unit configured to project a reference position image onto the support surface on which the medium is supported; and a housing configured to accommodate at least the recording unit and the projection unit, wherein the projection unit includes an irradiation unit configured to irradiate the support surface with light, and a light blocking portion configured to block a part of the light emitted from the irradiation unit, the light blocking portion includes at least one light blocking region configured to block the part of the light emitted from the irradiation unit, the projection unit is configured to project the reference position image onto the support surface by blocking the part of the light emitted by the irradiation unit with the at least one light blocking region, the reference position image indicating a reference position at which the medium is to be placed on the support surface, and the housing includes a light transmitting portion that is configured so that an inside of the housing can be visually recognized from an outside of the housing.

2. The recording apparatus according to claim 1, further comprising a control unit configured to control the irradiation unit, wherein the irradiation unit includes a first light source and a second light source, the first light source is located with a distance between the first light source and the at least one light blocking region being a first distance, the second light source is located with a distance between the second light source and the at least one light blocking region being a second distance longer than the first distance, the control unit is configured to perform control to switch to any one of a plurality of modes, the plurality of modes include a first mode and a second mode, the first mode is a mode in which both the first light source and the second light source are turned on, and the second mode is a mode in which the first light source is turned on and the second light source is turned off.

3. The recording apparatus according to claim 2, wherein the control unit controls the first light source so that a light emission intensity of the first light source in the second mode is higher than a light emission intensity of the first light source in the first mode.

4. The recording apparatus according to claim 1, further comprising a holding unit holding the light blocking portion with the light blocking portion being movable with respect to the irradiation unit, wherein the reference position image includes a first reference position image and a second reference position image different from the first reference position image, the at least one light blocking region includes a first light blocking region configured to form the first reference position image and a second light blocking region configured to form the second reference position image, and the holding unit holds the light blocking portion with a light blocking region disposed at a position closest to the irradiation unit being switchable between the first light blocking region and the second light blocking region.

5. The recording apparatus according to claim 1, further comprising a transport unit configured to transport the medium in a transport direction, wherein when a direction intersecting the transport direction is a width direction, the reference position image is an image that enables identification of a reference position of an end portion of the medium in the width direction.

6. The recording apparatus according to claim 5, further comprising a holding unit holding the light blocking portion with the light blocking portion being movable in the transport direction with respect to the irradiation unit.

7. The recording apparatus according to claim 1, further comprising:

a control unit configured to control the irradiation unit; and a position detection unit configured to detect a position of the light blocking portion, wherein the control unit controls the irradiation unit based on a result detected by the position detection unit.

8. The recording apparatus according to claim 1, further comprising a transport unit configured to transport the medium in a transport direction, wherein the transport unit includes a transport belt configured to support the medium to be transported, the support unit includes the transport belt, and the support surface is a surface at which the transport belt supports the medium.

9. A medium supporting device comprising:

a support unit including a support surface configured to support a medium being a recording target;

a projection unit configured to project a reference position image onto the support surface; and a housing configured to accommodate the projection unit, wherein the projection unit includes an irradiation unit configured to irradiate the support surface with light, and a light blocking portion configured to block a part of the light emitted from the irradiation unit, the light blocking portion includes at least one light blocking region that blocks the part of the light emitted from the irradiation unit, the projection unit is configured to project the reference position image onto the support surface by blocking the part of the light emitted by the irradiation unit with the at least one light blocking region, the reference position image indicating a reference position at which the medium is to be placed on the support surface, and the housing includes a light transmitting portion that is configured so that an inside of the housing can be visually recognized from an outside of the housing.

* * * * *